US008068601B2

(12) United States Patent
Shaffer et al.

(10) Patent No.: US 8,068,601 B2
(45) Date of Patent: Nov. 29, 2011

(54) QUEUING AND ROUTING TELEPHONE CALLS

(75) Inventors: Shmuel Shaffer, Palo Alto, CA (US); Labhesh Patel, San Francisco, CA (US); Mukul Jain, San Jose, CA (US); Sanjeev Kumar, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 1525 days.

(21) Appl. No.: 11/460,212

(22) Filed: Jul. 26, 2006

(65) Prior Publication Data

US 2008/0037763 A1     Feb. 14, 2008

(51) Int. Cl.
*H04M 3/00* (2006.01)
(52) U.S. Cl. ......... 379/266.02; 379/266.01; 379/265.02; 379/45; 455/456.2; 455/404.2
(58) Field of Classification Search ............ 379/45, 379/265.01, 265.02, 265.05, 265.07, 266.02; 455/456.3, 414.3, 404.2
See application file for complete search history.

(56) References Cited

U.S. PATENT DOCUMENTS

| | | | | |
|---|---|---|---|---|
| 5,309,513 | A * | 5/1994 | Rose | 379/265.12 |
| 5,825,869 | A * | 10/1998 | Brooks et al. | 379/265.12 |
| 6,170,011 | B1 * | 1/2001 | Macleod Beck et al. | 709/224 |
| 6,229,888 | B1 * | 5/2001 | Miloslavsky | 379/265.01 |
| 6,272,347 | B1 * | 8/2001 | Griffith et al. | 455/445 |
| 6,496,702 | B1 * | 12/2002 | Lockhart | 455/456.5 |
| 6,584,307 | B1 * | 6/2003 | Antonucci et al. | 455/422.1 |
| 6,690,932 | B1 * | 2/2004 | Barnier et al. | 455/414.1 |
| 6,754,335 | B1 * | 6/2004 | Shaffer et al. | 379/266.02 |
| 6,816,733 | B1 * | 11/2004 | Dezonno et al. | 455/456.1 |
| 6,934,379 | B2 * | 8/2005 | Falcon et al. | 379/265.02 |
| 7,349,535 | B2 * | 3/2008 | Shaffer et al. | 379/265.11 |
| 7,630,486 | B2 * | 12/2009 | Lee et al. | 379/265.01 |
| 7,711,354 | B1 * | 5/2010 | Pines et al. | 455/414.1 |
| 7,787,609 | B1 * | 8/2010 | Flockhart et al. | 379/265.01 |
| 7,848,510 | B2 * | 12/2010 | Shaffer et al. | 379/266.01 |
| 2003/0169870 | A1 * | 9/2003 | Stanford | 379/265.12 |

* cited by examiner

*Primary Examiner* — Sharad Rampuria
(74) *Attorney, Agent, or Firm* — Schwegman, Lundberg & Woessner, P.A.

(57) ABSTRACT

A method and system to process communications in an automatic communication distributor is described. The method may comprise receiving a communication and identifying an originating location from which the communication originates. Thereafter, a determination is made when the originating location corresponds to a predefined high priority geographical area and a priority to the communication is assigned based on the originating location. The call may be assigned a higher priority when the originating location corresponds to the high priority geographical area than when the originating location does not correspond with the high priority geographical area. The communication is queued based on the assigned priority. A method is also provided to assign an agent using an automated call distributor based on a distance between the originating location of the communication and the determined geographical locations of the potential respondents.

14 Claims, 10 Drawing Sheets

QUEUING AND ROUTING TELEPHONE CALLS

FIELD

This application relates generally to automated network communication distribution, and in an example embodiment to a method of and system for queuing and routing communications.

BACKGROUND

In telephone call centres, such as Emergency Response Centres (ERCs), the queuing and routing of telephone calls are of critical importance. For instance, when an emergency situation has occurred in a particular area, and sufficient information about the emergency has been obtained from calls by people in the area, further calls about that emergency should preferably have lower priority than new calls about a different emergency which has not yet been reported.

In prior art systems a call originating from a location of a known emergency is either placed in a low-priority queue, or played a pre-recorded message indicting that the emergency has already been reported, thereby reducing duplication of emergency reports.

BRIEF DESCRIPTION OF DRAWINGS

The present invention is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of embodiments of the present invention. It will be evident, however, to one skilled in the art that the present invention may be practiced without these specific details.

Figure 1:
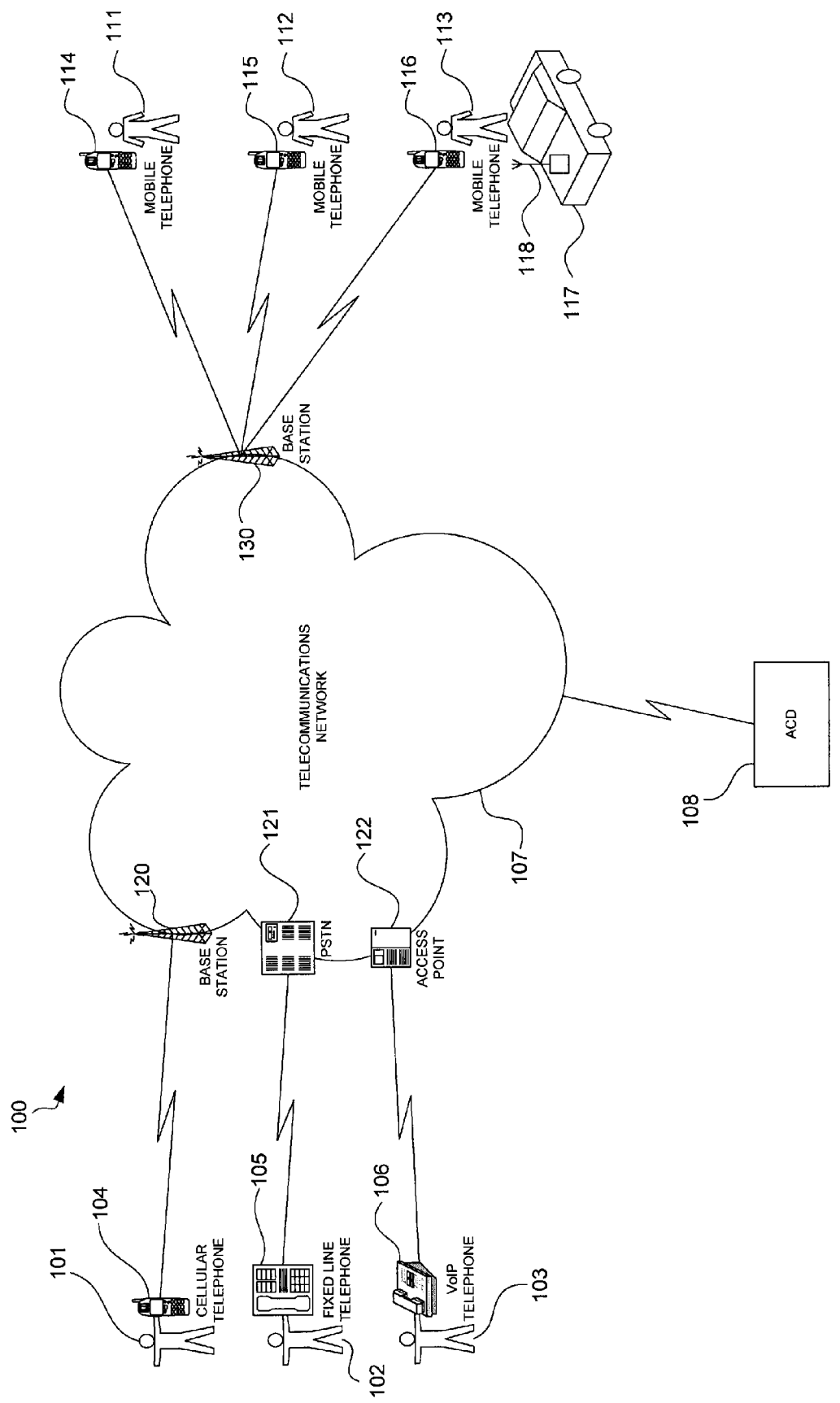
FIG. 1 shows a diagrammatic representation of a system in accordance with an example embodiment.

FIG. 1 of the drawings shows a system 100 for automatic distribution and routing of communications such as telephone calls used in an example embodiment. A plurality of callers 101 to 103 are shown in communication with an Automated Call Distributor (ACD) 108 (only one of which is shown by way of example) via a telecommunications network 107. In the example embodiment, the ACD 108 serves to route emergency or 911 telephone calls from the callers 101 to 103 to appropriate respondents or agents 111 to 113.

The callers 101 to 103 communicate with the ACD 108 via respective communication devices 104 to 106, typically in the form of telephones. By way of example, caller 101 has a mobile telephone in the form of a cellular telephone 104, caller 102 has a fixed-line telephone 105, while caller 103 has a VoIP telephone 106. It will be appreciated that, for illustrative purposes, only three callers 101 to 103 are shown and that the number of callers may vary, as may the communication devices used by the callers. In other embodiments the communication devices may be PDAs (Personal Digital Assistants), computers having a computer telephony interface, or the like. Any one or more communication methods (e.g., video, Instant Messaging (IM), email, or the like) may be used in addition to, or instead of a telephone communication.

The telecommunications network 107 may include a plurality of cellular telephone base stations, a fixed-line telephone network, the Internet, or the like. In this example embodiment, the telecommunications network 107 includes at least one base station 120, via which the cellular telephone 104 is connected, a PSTN (Public Switched Telephone Network) 121, through which the fixed-line telephone 105 can connect to the telecommunications network 107, and at least one wireless (or wired) access point 122, via which the VoIP telephone 106 can connect to the telecommunications network 107.

Figure 2:
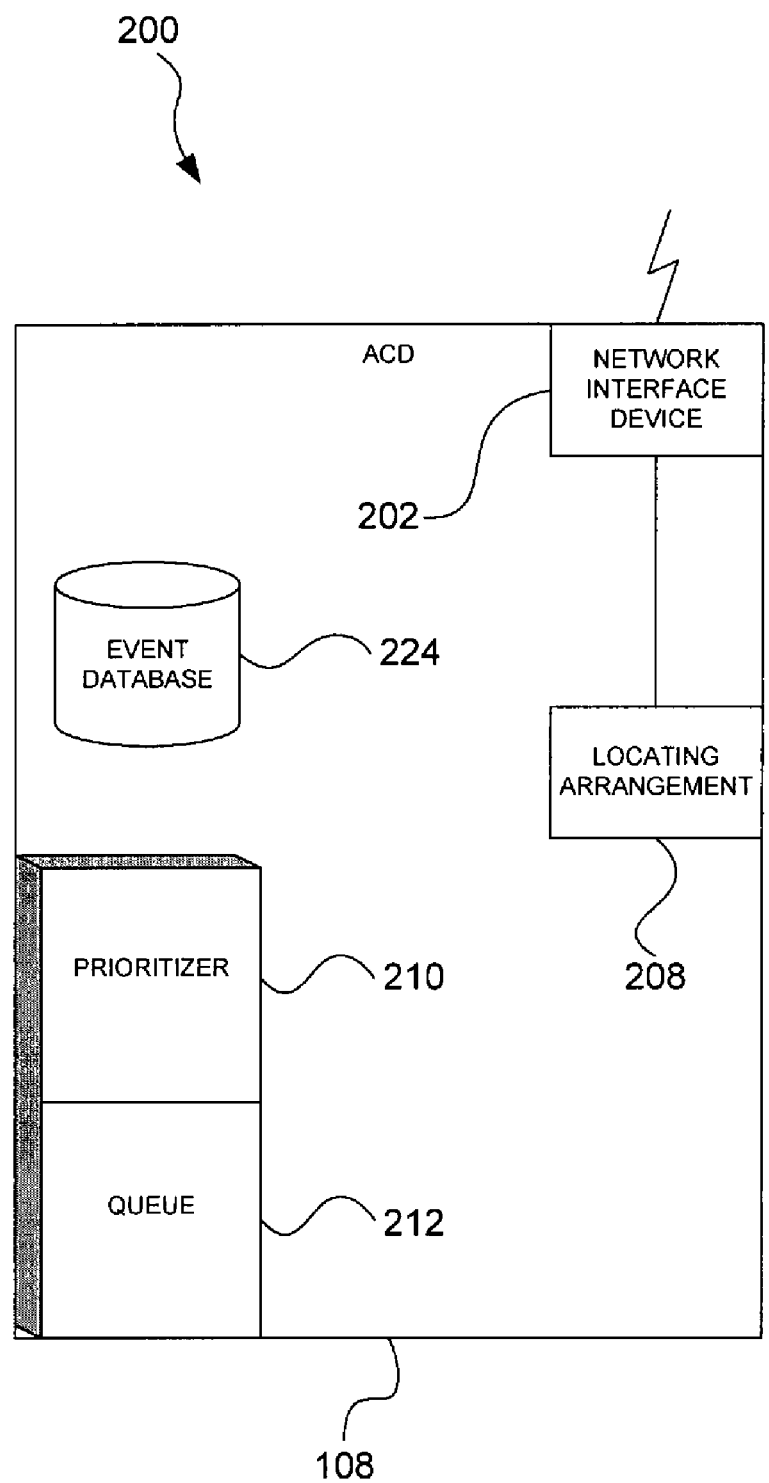
FIGS. 2 to 4 show diagrammatic representations of automated call distribution apparatuses used in respective example embodiments.
Figure 3:
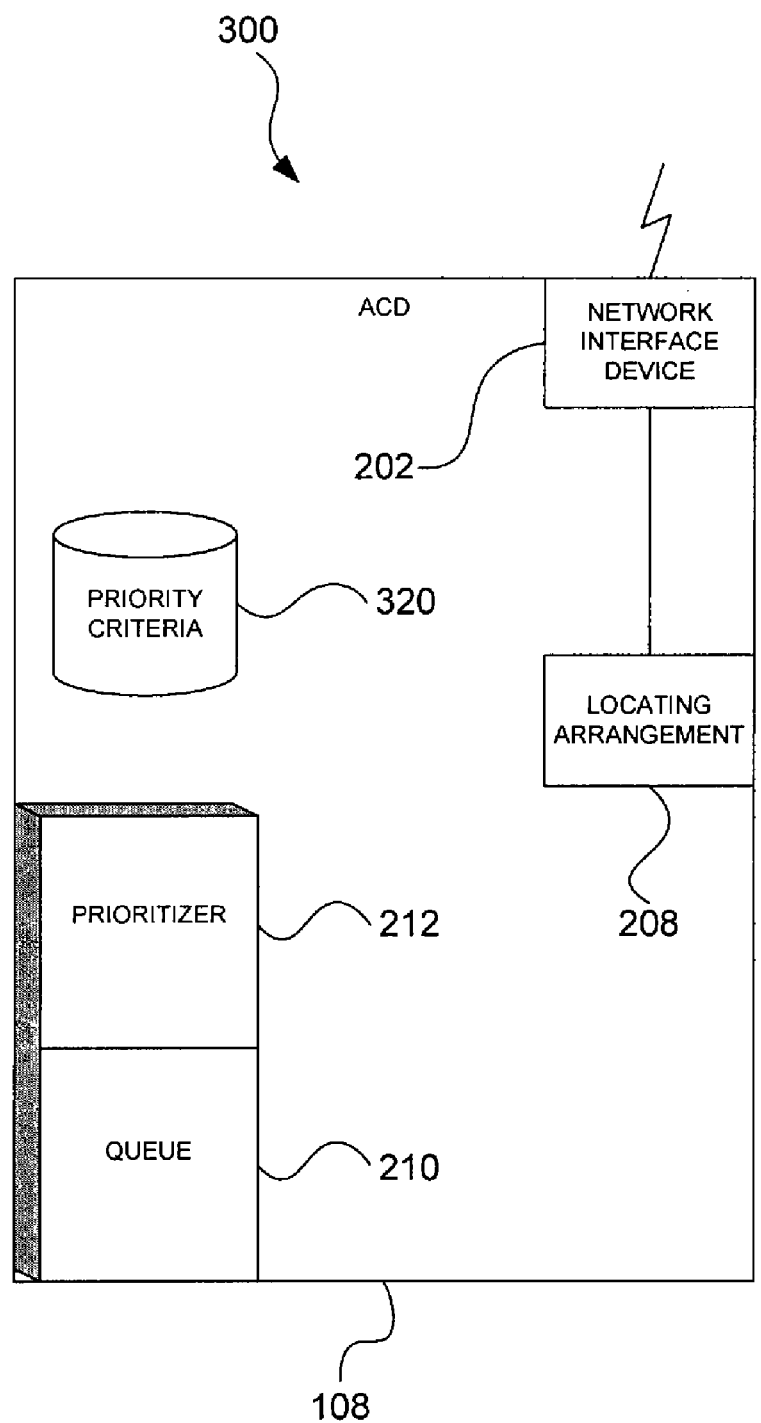
Figure 4:
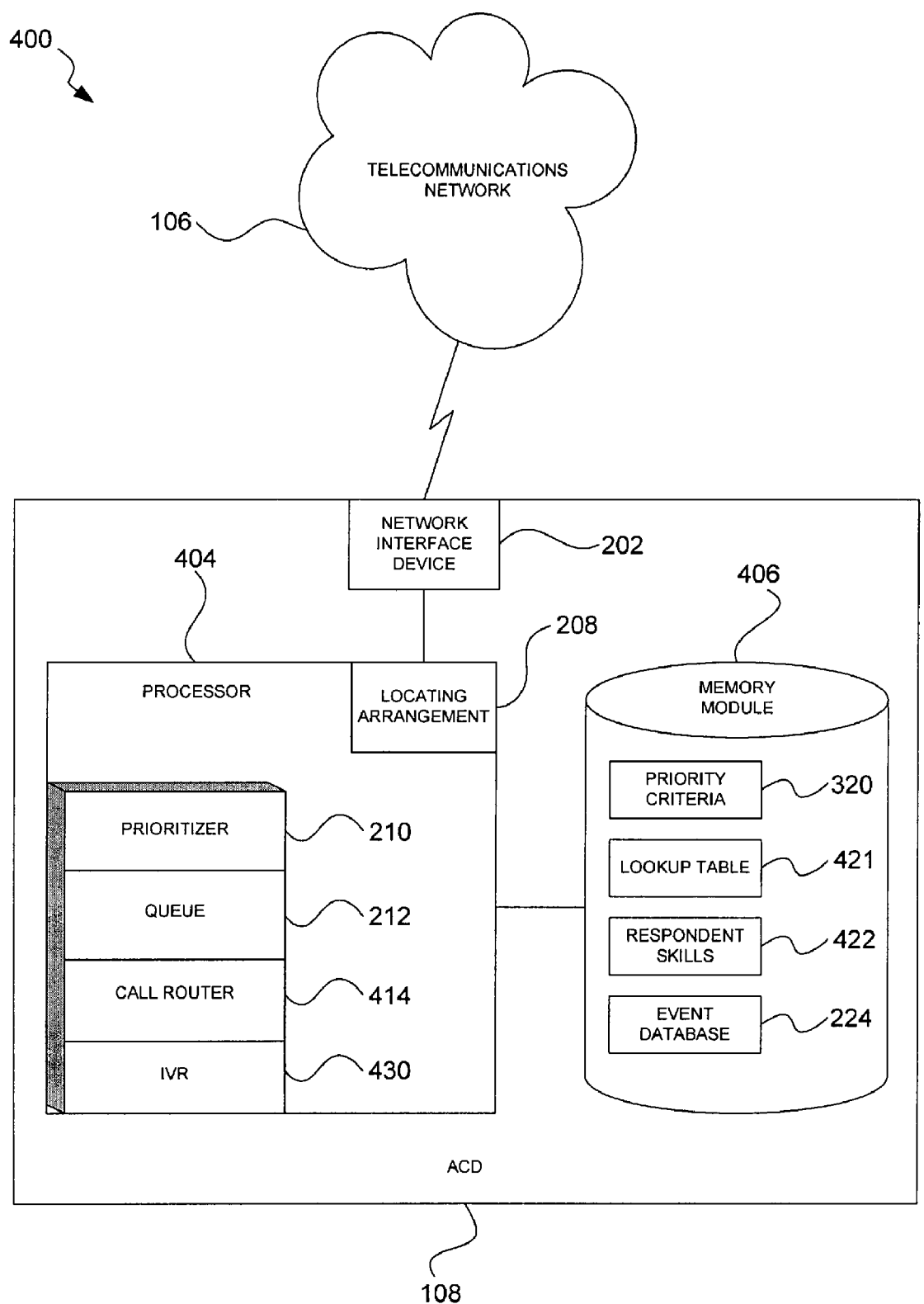

The ACD 108 is further described by way of example with reference to FIGS. 2 to 4. In an example embodiment, the ACD 108 is in the form of an Emergency Response Centre (ERC), but it is to be understood that the ACD 108 may service any system which includes respondents or agents, who may be mobile and who respond to calls originating from different locations. A system such as that described with reference to the drawings can thus also be employed in applications such as organising the movement and response of telephone or utility company repairmen, shop assistants in large retail stores, and the like. The telephones 104 to 106 can connect to the ACD 108 through the telecommunications network 107, so that the ACD 108 can simultaneously process, for instance, wireless telephone calls, fixed-line telephone calls, VoIP telephone calls, and the like.

In the example embodiment, the respondents 111 to 113 are emergency response units, such as police cruisers which are mobile or roaming, preferably operating in one or more pre-defined areas or zones. Each respondent 111 to 113 has a mobile communication device, typically a mobile telephone 114 to 116, the respondents 111 to 113 therefore also being in communication with the telecommunication network 107, for example via a base station 130 if the mobile telephones 114 to 116 are cellular telephones. The mobile communication device could instead be PDA, IP telephone, laptop having a computer telephony interface, or the like capable of voice and/or text messages.

FIG. 2 shows a system 200 in accordance with an example embodiment. The system 200 is shown to include the ACD 108 of FIG. 1. The ACD 108 has a communication arrangement in the form of a network interface device 202 for communication with the telecommunications network 107. The ACD 108 further includes a locating arrangement 208 to determine the location from which calls originate, a queuing module or queue 212 to queue incoming telephone calls in order of descending priority, and a prioritizer 210 for prioritising telephone calls in the queue 212. The ACD 108 further includes an event database 224 in which information about events reported by incoming telephone calls are stored, the prioritizer 210 being in communication with the event database 224 to prioritise incoming calls based on their location and their assumed relation to high priority events stored in the event database 224.

FIG. 3 shows a system 300 in accordance with another example embodiment. The system 300 is similar to that of FIG. 2, but instead of an event database 224, the system 300 includes pre-defined priority criteria 320 which is used by the prioritizer 210 to establish the priority of calls in the queue

212. FIGS. 2 and 3 are broad system overviews, and are described in more detail with reference to FIG. 4.

FIG. 4 shows a system 400 which includes the ACD 108, the ACD 108 having an electronic processor 404 and a memory module 406. The processor 404 is operable to perform routing, prioritising, locating, and queuing tasks. The ACD 108 may thus include software to direct the operation of the processor 404. The processor 404 includes the locating arrangement 208, the prioritizer 210, and the queue 212 of FIGS. 2 and 3. The processor 404 further includes a call router 414. The illustrated modules 208, 210, 212, 414 correspond to particular tasks performed by the processor 404 of the ACD 108. It is to be understood that the particular tasks may be distributed among several processors or even among several ACDs or computer systems, or that multiple tasks may be consolidated within a single ACD (as illustrated by way of example).

The locating arrangement 208 is operable to determine the location of the telephones 104 to 106 (and therefore of the callers 101 to 103). The locating arrangement 208 determines the location of the telephones 104 to 106 in different ways depending on the type of telephone from which a call is made. If the call is made from a cellular telephone 104, the locating arrangement 208 may determine its location by establishing the location of the particular base station 120 via which the cellular telephone 104 connects to the telecommunications network 107 or identify its location using triangulation using multiple base stations. However, the location of calls made from fixed-line telephone, e.g. 105, is determined based on the telephone number of the fixed-line telephone 105 (e.g., using ANI techniques). Calls made from VoIP telephones 106 may be geographically traced by determining the Access Point through which the VoIP telephone 106 connects to the telecommunications network 107 or based on the port of the router or switch through which the IP phone connects to the LAN/WAN.

The locating arrangement 208 may also be configured for determining the respective locations of the respondents' mobile telephones 114 to 116 in a similar manner to that described above. Instead, or in addition, any one or more of the respondents 111 to 113 may be associated with a GPS (Global Positioning System) module 118 (e.g. which is installed in a patrol vehicle 117) whose movement corresponds to the movement of the respective respondent. The locating arrangement in such case may be operable to receive a communication from the GPS module 118, so that the locations of the respondents 111 to 113 are determined by establishing the position of the associated GPS module 118. It will be appreciated that the method of determining the location of the respondents 111 to 113 may vary depending on the particular application of the system. For instance, where emergency calls are to be communicated to police officers in cruisers, each cruiser may have a resident GPS module. In contrast, foot patrol units can more readily be located by determining the position of their respective mobile telephones 114 to 116. One or more respondents 111 to 113 may be selected to respond to the emergency call. Respondents may be selected based on their geographical distance from an emergency location. For example, a respondent closest to the emergency location (e.g., the shortest distance in miles or kilometers) may be deployed. In an example embodiment, speed of travel between the respondent and the emergency location may be factored in (e.g., freeway driving as opposed to suburban street driving). Accordingly, both distance and/or travel time may be taken into account.

The prioritizer 210 is operable to prioritise incoming calls based on priority criteria, e.g. the location of the caller 101 to 103. The priority criteria may be embodied in priority criteria 320 stored on the memory module 406. In an example embodiment, the priority criteria 320 may be predefined and/or dynamically variable. In response to a change in the priority criteria 320, the prioritizer 210 is operable in an example embodiment to re-prioritise a queued incoming call. The prioritizer 210 in addition may assign certain skills to the incoming call, so that the call should only be routed to a respondent 111 to 113 with the requisite skills.

The queue 212 manages and maintains calls that are waiting to be connected to the respondents 111 to 113 or to a telephone operator (not shown). Calls are preferably queued sequentially, based on the priority or rank of the calls as determined by the prioritizer 210.

Calls in the queue 212 may be forwarded or routed by the call router 414 to their destination, typically a respondent 111 to 113. The calls are routed based on their order or priority in the queue 212. Thus, calls at the front of the queue 212 may be routed first.

The memory module 406 includes a database comprising a plurality of telephone numbers or number prefixes and their associated geographic locations in the form of a lookup table 421. When caller 102 calls from the fixed-line telephone 105, the ACD 108 determines a telephone number of the caller 102 using a caller ID associated with the telephone call, and interrogates the lookup table 421 to determine a location of the caller 102, the lookup table 421 therefore forming part of the locating arrangement.

The memory module 406 of the ACD 108 may further include a database of respondent skills 422 which includes skills attributed to the respondents 111 to 113, as well as information on the availability status of respondents 111 to 113.

The ACD 108 may include an IVR (Interactive Voice Response) system 430, initially to guide and extract information from the callers 101 to 103. The IVR system 430 may be in the form of a software program.

Figure 5:
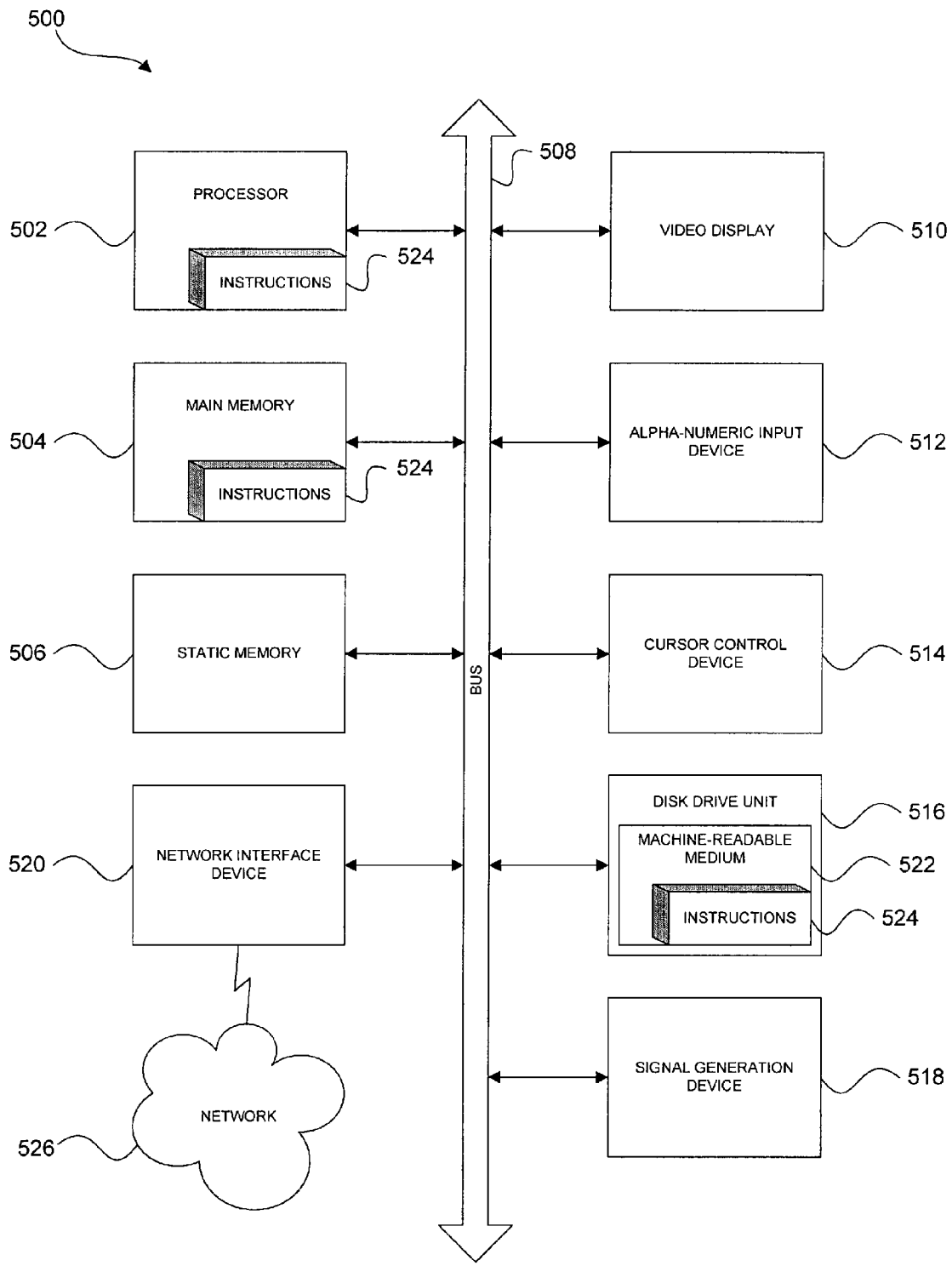
FIG. 5 shows a diagrammatic representation of a machine in the example form of a computer system within which a set of instructions, for causing the machine to perform any one or more of the methodologies discussed herein, may be executed.
Figure 6:
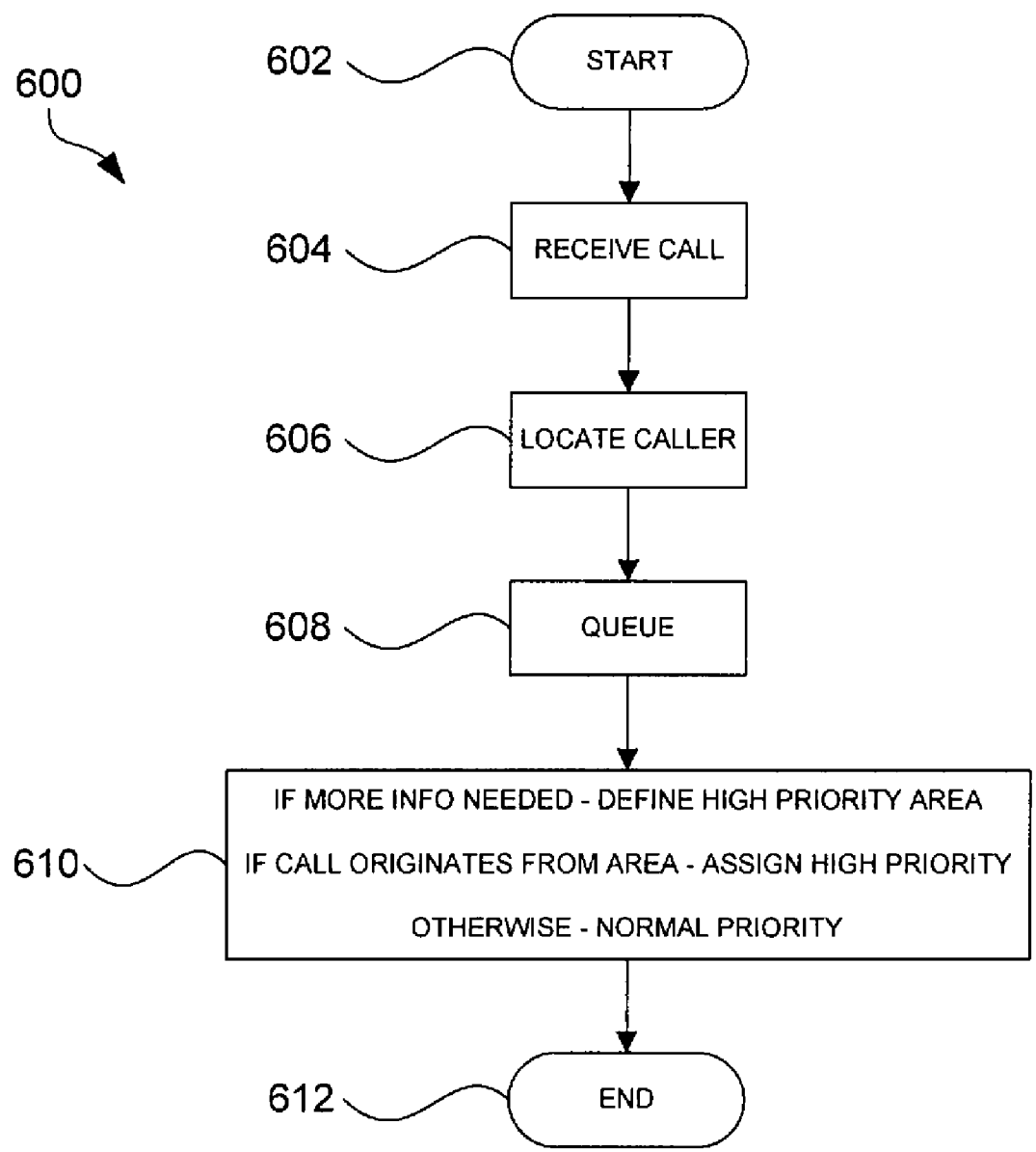
FIGS. 6 to 10 show flow diagrams of methods in accordance with example embodiments.

FIG. 5 shows a diagrammatic representation of machine in the example form of a computer system 500 within which a set of instructions, for causing the machine to perform any one or more of the methodologies discussed herein, may be executed. In alternative embodiments, the machine operates as a standalone device or may be connected (for example, networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor 502 (for example, a central processing unit (CPU), a graphics processing unit (GPU) or both), a main memory 504 and a static memory 506, which communicate with each other via a bus 508. The computer system 500 may further include a video display unit 510 (for example, a liquid crystal display (LCD) or a cathode ray tube (CRT)). The computer system 500 also includes an alphanumeric input device 512 (for example, a keyboard), a user interface (UI) navigation device 514 (for example, a mouse), a disk drive unit 516, a signal generation device 518 (for example, a speaker) and a network interface device 520.

The disk drive unit 516 includes a machine-readable medium 522 on which is stored one or more sets of instructions and data structures (for example, software 524) embodying or utilized by any one or more of the methodologies or functions described herein. The software 524 may also reside, completely or at least partially, within the main memory 504 and/or within the processor 502 during execution thereof by the computer system 500, the main memory 504 and the processor 502 also constituting machine-readable media.

The software 524 may further be transmitted or received over a network 526 via the network interface device 520 utilizing any one of a number of well-known transfer protocols (for example, HTTP).

While the machine-readable medium 522 is shown in an example embodiment to be a single medium, the term "machine-readable medium" should be taken to include a single medium or multiple media (for example, a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

The ACD 108 may be provided by machine such as the computer system 500 of FIG. 5.

Example embodiments are further described in use, with reference to FIGS. 6 to 10, which all show flow diagrams. An example embodiment is described with reference to FIGS. 6 and 7, which respectively show a broad flow diagram 600, and a more specific flow diagram 700 of a particular embodiment. Flow diagram 600 starts at block 602 when an incoming telephone call about an emergency event is received, at block 604, from a caller by a receiving arrangement (e.g. the network interface device 202). The location from which the telephone call originates is determined, at block 606, and the telephone call is queued, at block 608. If the call relates to any event about which more information is required, a high priority geographical area associated with the location of that call is defined, at block 610. Subsequent incoming telephone calls, originating at block 604, are assigned a higher priority, at block 610, if the location of the telephone call, as determined at block 606, falls within a high priority area that has already been defined.

Flow diagram 700, which starts at block 702, describes the embodiment in more detail. In this embodiment, the ACD 108 forms part of a 911 ERC, and reference is made also to FIGS. 2 and 4. When a witness or bystander 101 witnesses an event, for example an explosion in a nearby building, which he/she wishes to report, the witness 101 may initiate a 911 call from his/her cellular telephone 104. The ACD 108 receives the call, at block 704, upon which the locating arrangement 208 automatically determines, at block 706, an originating location of the telephone call. As the call in this example is made from a cellular telephone, the GPS location of the calling party is conveyed to the location arrangement 208. The event database 224 on the memory module 406 is then automatically used by the prioritizer 210 to determine, at block 708, whether or not the originating location of the telephone call which has just been received falls within a geographical area which has been designated as a high priority area. The prioritizer 210 may be configured to assign to a call a normal priority if the originating location does not fall within a pre-defined high priority area. As, in the current example, caller 101 is the first caller to report the event, the originating location of the telephone call by caller 101 is not already in a high priority area, the call may be assigned, at block 712, a normal priority by the prioritizer 210. The call is then queued, at block 714, in the queue 212, in accordance with its assigned priority. A call having a normal priority is typically placed at the back of the queue 212. Even though the queue 212 is discussed as a single queue, it should be understood that it may comprise multiple queues. Each queue may have an appropriate priority.

The ACD 108 then checks, at block 716, for the availability of a telephone operator to handle the call. As long as the call is not first in the queue 212, the call remains in the queue 212, moving forward as other calls are handled. When an operator becomes available to handle the call, the call router 414 routes the call to the operator to whom the caller 101 reports the event, at block 718. It often happens that a witness has only partial details of an event, and further details may be urgently required in order to decide how to best to deal with the event. The operator decides, at block 720, whether or not further details are required. In this example, caller 101 may not be aware of the range of the explosion or of the damage done by the explosion, and further details are thus required. In such a case, the operator may define, at block 724, a high priority area, for example having a centre at the originating location (e.g. the location of caller 101) or at the location of the explosion and having a radius of two miles. The ACD 108 may therefore include a user interface (e.g. keyboard, mouse, etc.) via which the ACD 108 can receive the definition of the high priority area from the operator. This area may thus be designated as a high priority area and details of the area are stored in the event database 224. In another embodiment, the ACD 108 is configured automatically to define the high priority area, based on the location of caller 101 and pre-set radius criteria. These pre-set radius criteria may vary depending on the type of incident which is reported on, the radius at which witnesses can be expected to give valuable reports. Thus, the radius an industrial explosion may be greater than that for a mugging. The call is shown to be terminated, at block 722. The operator may dispatch, at block 726, emergency response personnel as required. The flow-diagram 700 ends at block 728.

When further calls in respect of the event is received, for example from a second caller 102 which calls 911 from a nearby fixed-line telephone 105, similar steps are followed as those for the first call described above. At block 706, the locating arrangement receives the telephone number of the fixed-line telephone 105, for example, ANI techniques, and may interrogate the lookup table 421 to determine the location of caller 102. When the location of caller 102 is within the high priority area, the prioritizer 210 assigns, at block 710, the call a high priority, and the call is placed, at block 714, closer to the front of the queue 212 than would otherwise be the case. In an example embodiment, the queue 212 comprises a plurality of queues wherein each queue may be used for queuing calls at different respective priorities. If, at block 718, the caller 102 reports further on the event, the operator can refine, at block 724, the high priority area, for example by reducing the radius to one mile or relocating the centre of the area. Instead, or in addition, the operator can mark the event as fully reported, so that further calls originating from that area are no longer assigned a higher priority. In this way, calls relating to events about which some information is outstanding are assigned a higher priority, so that full details can be obtain more quickly to facilitate despatching or deployment of the correct personnel to the scene.

Further example embodiments are described with reference to FIGS. 8 to 10, which respectively show a broad flow diagram 800, and more specific flow diagrams 900 and 1000 of example embodiments. Flow diagram 800 starts at block 802, when an incoming telephone call is received, at block 804, from a caller. A location from which the incoming telephone call originates is determined, at block 806, and the locations of potential mobile respondents are similarly determined, at block 808. An appropriate respondent is selected, at block 810, based on the location of the incoming call and the location of the potential respondents, after which a communication is sent, at block 812, to the selected respondent by a sending arrangement (e.g. the call router 414, the IVR system 430, and/or the network interface device 202). The flow diagram 800 ends at block 814.

Figure 8:
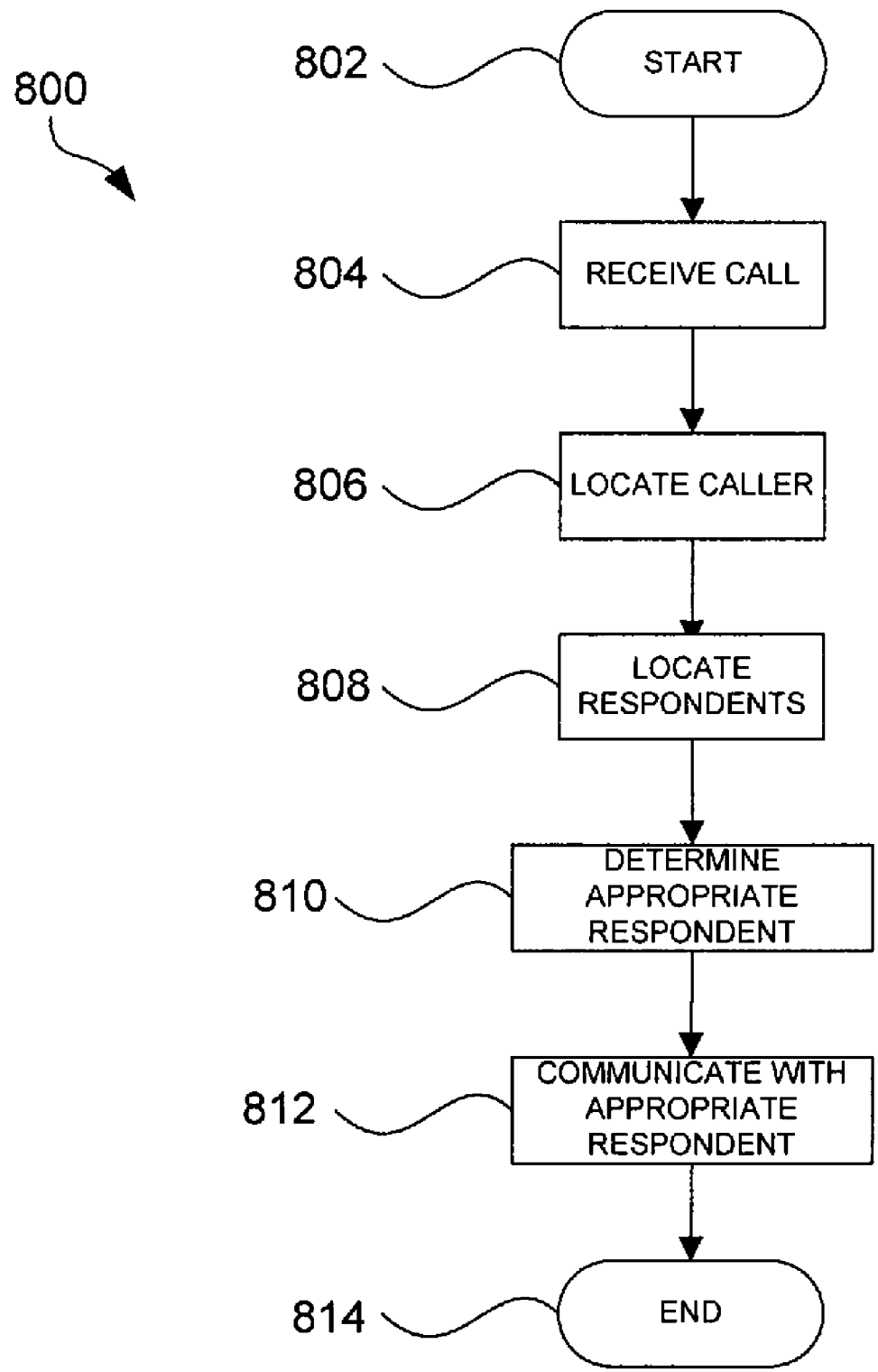

Flow diagram 900, which starts at block 902, describes the example embodiment of FIG. 8 in more detail. In this embodiment, the ACD 108 again forms part of a 911 ERC, and reference is made also to FIGS. 3 and 4. When a caller 101 wishes to report a crime or to call for assistance, the caller may initiate a 911 from his/her cellular telephone 104. The ACD 108 receives, at block 904, the call and the locating arrangement 208, determines, at block 906, the location of caller 101 in the manner previously described.

The locating arrangement 208 then locates, at block 908, all the active respondents 111 to 113. It is to be understood that in certain circumstances, it is preferable for police officers patrolling or cruising in their police vehicles 117 to handle calls. The respondents 111 to 113 in this embodiment may therefore be patrolling police officers. The step of locating the respondents 111 to 113 could include locating the mobile telephone 114 to 116 of the respondents 111 to 113, in similar fashion to locating caller 101 at step 906. However, in this embodiment, the police vehicles 117 each have a GPS module 118 installed therein, and the respondents 111 to 113 may therefore be located by communicating with the respective GPS modules 118. The respondents 111 to 113 may conveniently logon to the ACD 108 from a user interface in their vehicles 117 to indicate that they are available to handle telephone calls.

It is to be understood that each respondent 111 to 113 typically has certain skills or attributes assigned to them, as recorded in the respondent skills database 422. The skills may be based on the nature of the reported event, the nature of the respondent 111 to 113, or the like. For example, some respondents 111 to 113 may only be assigned a skill to handle traffic related events, while others may be designated suitable for critical medical emergencies or dealing with armed conflict. The ACD 108 determines, at block 910, which respondents 111 to 113 have the requisite skills to handle the particular call, by checking the skills database 422 against the priority of the call. It is to be understood that in this first iteration of the flow diagram 900, the call has not yet been assigned any particular skills which the respondents 111 to 113 are required to have in order to handle the call.

The ACD 108 determines, at block 912, the nearest available respondent 111 to 113 who has the requisite skills to handle the call, based on the relative locations of caller 101 and respective respondents 111 to 113. In the first iteration of the process, the selected respondent may be the respondent 111 which is the nearest to caller 101. The ACD 108 then places, at block 914, the call in the queue 212 until respondent 111 is available to answer the call. However, by the time that the respondent 111 is ready to answer the call, he or she may have already driven to another location, or no longer be the most appropriate respondent to attend to the situation. Therefore, in an example embodiment, the system re-assesses the relative location of the caller and the respondent continuously (or intermittently) to find the best match for the call when it reaches the top of the queue.

When respondent 111 is available, the router 414 routes, at block 916, the call to respondent 111, who enquires about the nature of the event to determine, at block 918, whether or not he/she has the requisite skills to handle the call. If no special skills are required to handle the call, or if the respondent 111 has the skills required to handle the call, respondent 111 responds, at block 920, with the appropriate action, for example by driving to the location of caller 101, and the call is terminated, at block 922.

However, if respondent 111 cannot respond to the call or does not have the skills required to handle the call, the respondent 111 modifies, at block 924, the priority of the call, from the user interface in his/her vehicle, for example by assigning a higher priority to the call or by assigning associated required skills to the call. In another embodiment (not shown), respondent 111 can directly transfer the call to another respondent 112 who has the requisite skills and who is known to be proximate caller 101.

If the skills or priority of the call has been modified, at block 924, the ACD 108 again determines, at block 910, which of the respondents 111 to 113 have the requisite skills to handle the call. The ACD 108 may for instance determine, at block 912, that the nearest respondent who has the necessary skills to handle the call is respondent 112. When respondent 112 responds, at block 920, to the call, the caller 101 speaks to someone who is qualified to handle the particular event and is in a position to provide quick assistance, thereby assuring a more efficient and appropriate response. The method is shown to end at block 926.

Another example embodiment is described with reference to FIG. 10, which shows a flow-diagram 1000, starting at block 1002. In this embodiment, the ACD 108 yet again forms part of a 911 ERC, and reference is again made to FIGS. 3 and 4. Steps 1004 to 1008 correspond to steps 904 to 908 of flow chart 900.

The incoming calls are placed, at block 1010, in the queue 212. The ACD 108 determines, at block 1012, an appropriate respondent to respond, based on the relative locations of caller 101 and the respondents 111 to 113, and on the priority criteria 320 (which in this embodiment may also be thought of as deployment rules). Potential respondents 111 to 113 may be assigned availability statuses, for example being classified as "engaged in a mission" or "cruising the neighbourhood".

The ACD 108 continually scans the locations of calls in the queue 212. If a plurality of calls in the queue 212 originate from locations proximate one another, the ACD 108 communicates a message to a suitable respondent 111 to 113 to deploy, at block 1014, to that location while the calls are still in the queue 212. For example, if respondent 111 is engaged in a mission and therefore cannot respond, and respondent 112 is cruising another neighbourhood, to which he is restricted, while respondent 113 is cruising the neighbourhood and is available to respond to the calls in the queue 212, then the call is routed to the available respondent 113.

The priority criteria 320 may further be based on the type of location from which the calls originate. If a number of calls originate from the same, more public location, for example a highway, then one respondent 111 to 113 may be deployed to handle multiple calls, the callers 101 to 103 being more likely to be reporting the same event (for example a single traffic accident). If, however, geographically proximate calls originate from a more private location, for example a residential suburb, one respondent 111 to 113 may be deployed to handle each call, the callers 101 to 103 being more likely to be reporting different events.

Depending on the circumstances, respondent 113 may wish to answer multiple calls at once. The ACD 108 determines, at block 1016, whether or not multiple calls originate from proximate locations (for example, within a seven mile radius of one another). If, for instance, there are no other calls currently in the queue 212 which originate from a location proximate the call of caller 101, the call is routed, at block 1018, by the call router 414 to respondent 113, which responds, at block 1026.

If, for example, there are other calls (e.g., also from callers 102 and 103) which are currently in the queue 212 and which originate from a location proximate the call of caller 101, callers 102, 103 are prompted, at block 1020, by the IVR system 430 to conference in the calls, should they wish to do so. If one (or more) caller does not wish for the calls to be conferenced in/together (for example if they are reporting on a crime of a private nature), then the calls will be handled separately. If callers 102, 103 do wish for their calls to be conferenced together (for example if they are reporting on a crime of a public nature), the calls are conferenced, at block 1022, together, so that the respondent 113 may respond to all callers 102, 103 simultaneously, resulting in more efficient execution of duties of emergency services.

In another example embodiment, the operator of the ACD 108 may conference the telephone calls together (e.g. by entering a command on the user interface of the ACD 108), if the operator or dispatcher thinks it would be advantageous to do so. Instead, or in addition, the ACD 108 may be configured to allow the respondent 113 to conference the telephone calls together remotely, e.g. by entering a command on the user interface of the vehicle 117. It is to be appreciated that in certain situations, the operator and/or respondent may be in a better position than a caller to decide whether or not the events are related and therefore whether or not the calls from respective callers 102, 103 should be conferenced together.

The call(s) are terminated at block 1028, and the flow diagram 1000 ends at block 1030.

Figure 7:
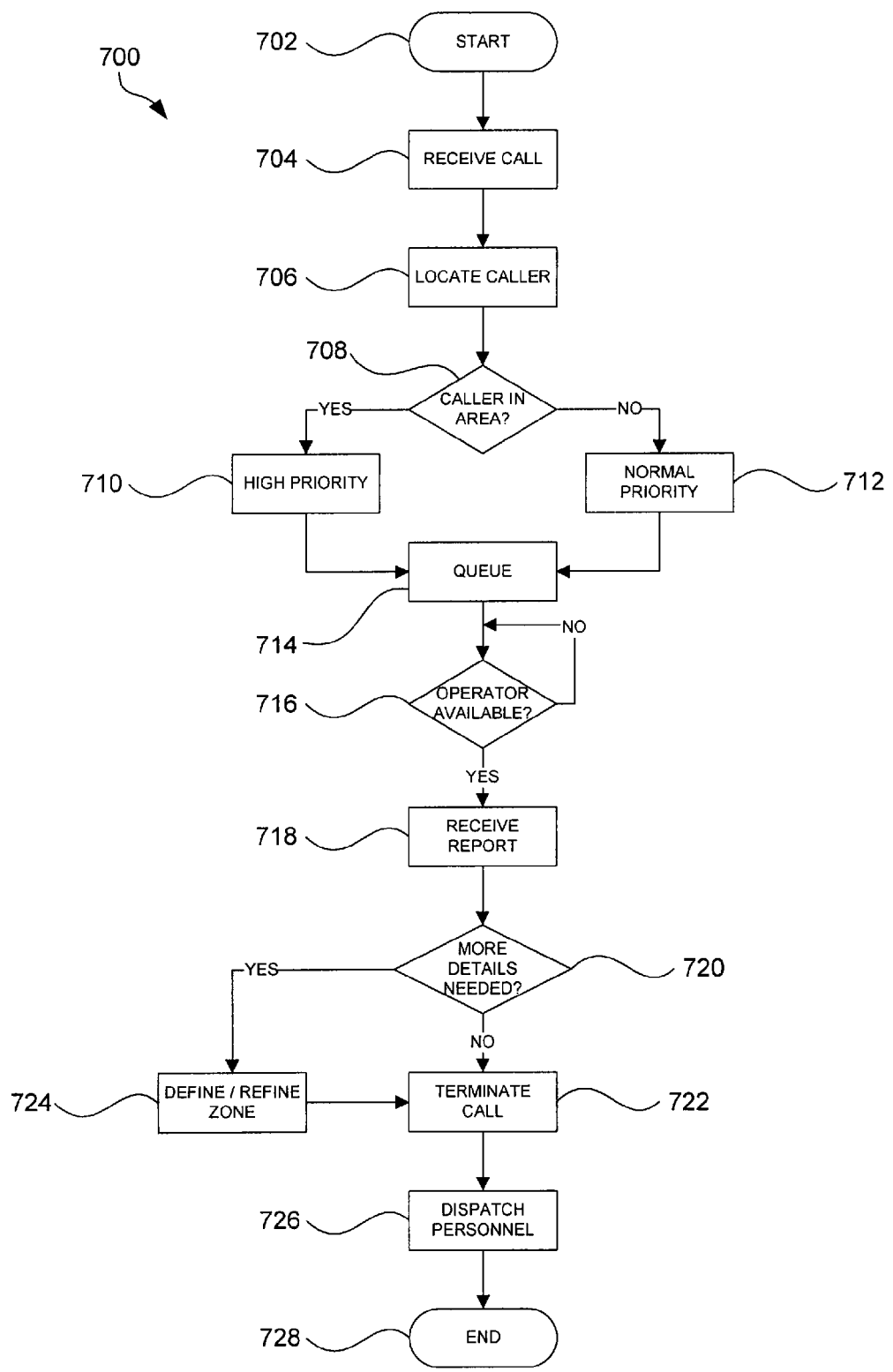
Figure 9:
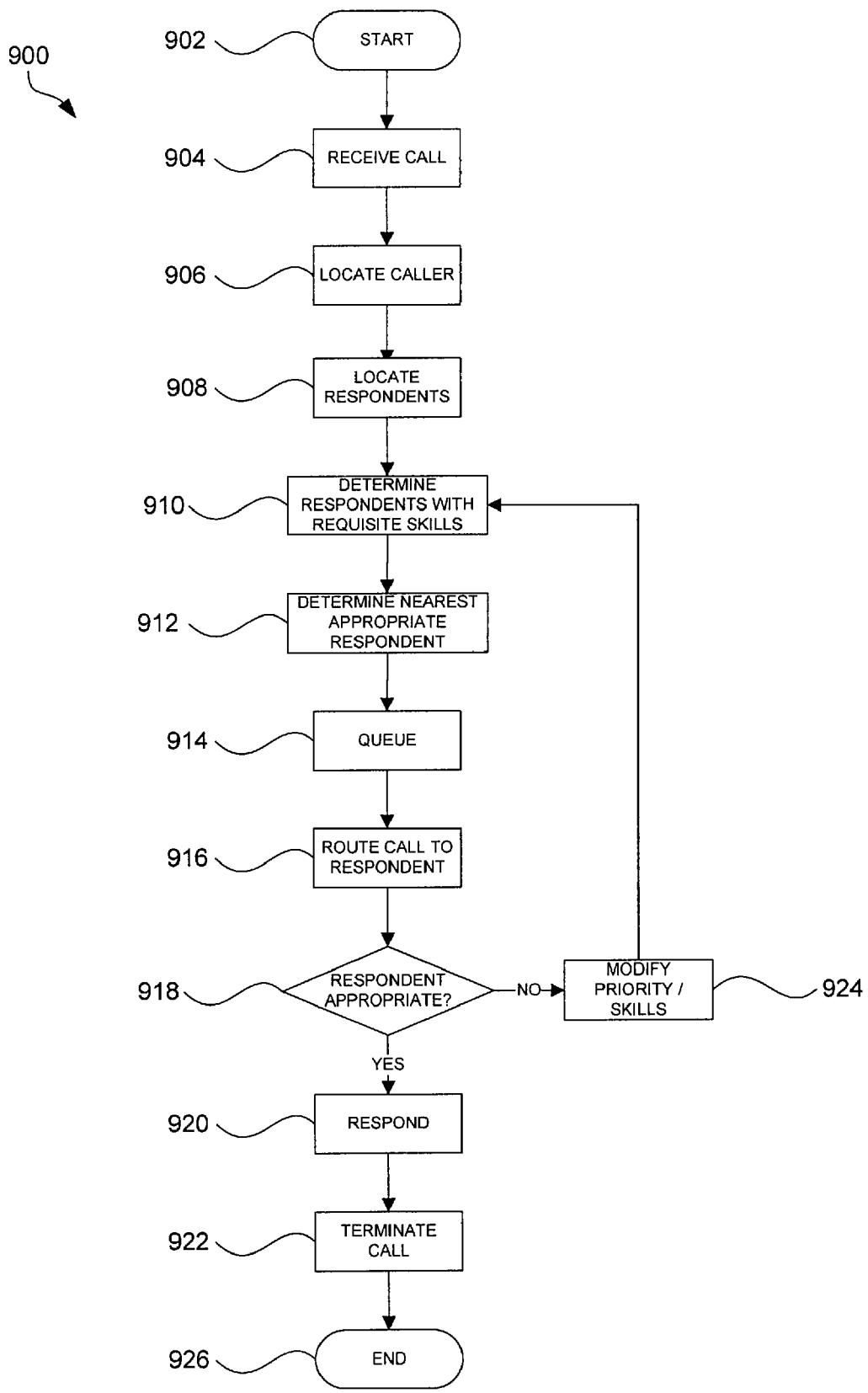
Figure 10:
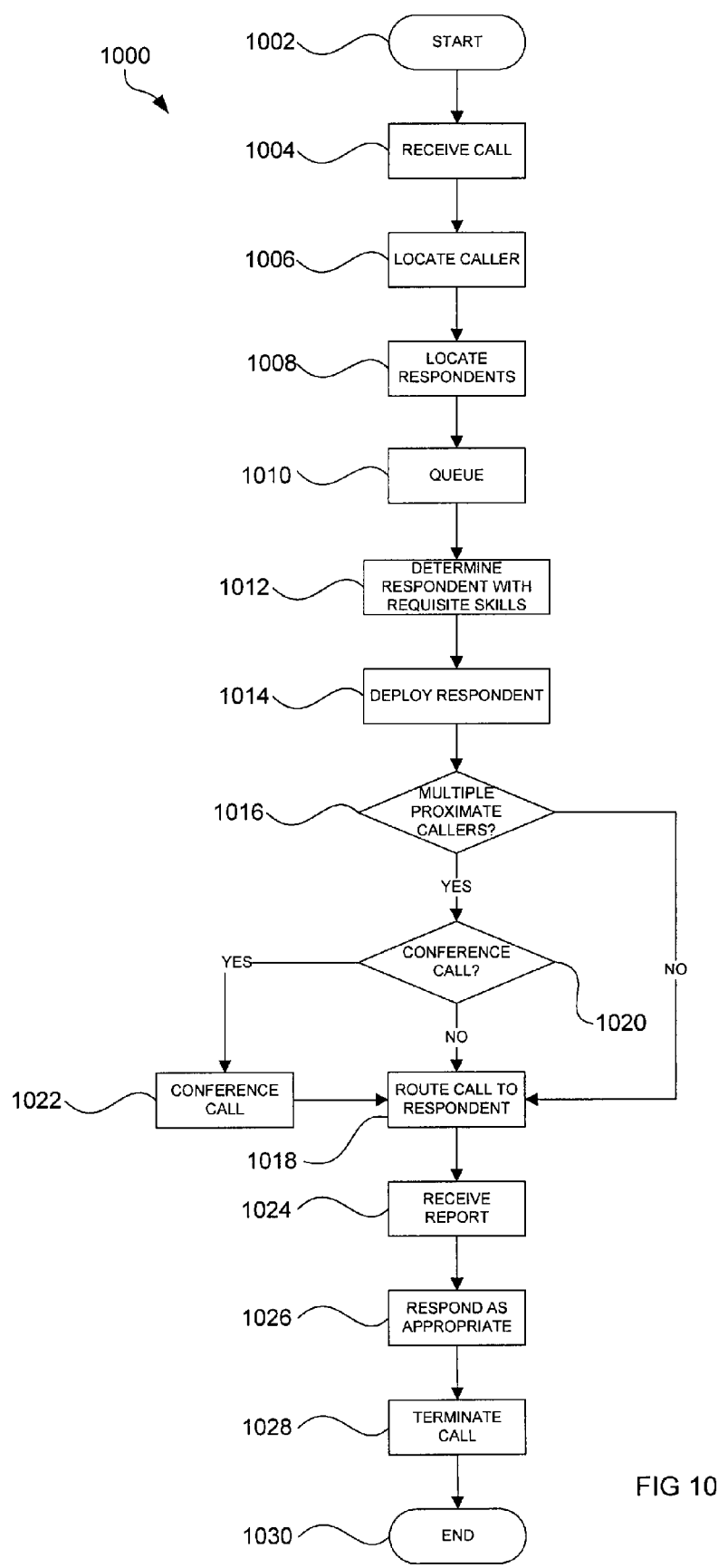

For clarity of description, the methodologies of FIGS. 7, 9, and 10 have been described separately, but it will be appreciated that the features of the respective methods are not mutually exclusive and can be used in combination.

Further, it is important to note that, even though the example embodiments above are discussed with respect to a telephone call they equally apply to other multimedia modalities or communications including a video call, an Instant Message (IM), Chat, radio or any other communication. Thus, any method of communication may be interchangeable with the example telephone communication between an agent and a caller as described herein.

Although embodiments of the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of assigning an agent using an automated communication distributor, the method comprising:
   receiving an incoming communication;
   identifying an originating location from which the communication originates;
   determining geographical locations of potential mobile respondents to the communication;
   identifying skills required of the potential mobile respondents to respond to the communication;
   accessing a skills database identifying actual skills of the respective potential mobile respondents;
   selecting at least one respondent of the potential mobile respondents based on a distance between the originating location of the communication and the determined geographical locations of the potential mobile respondents, and based on the skills required and the actual skills; and
   assigning the selected at least one respondent to respond to the communication.

2. The method as claimed in claim 1, which comprises identifying an availability status of the potential mobile respondents, and selecting the at least one respondent based on an associated availability status.

3. The method as claimed in claim 1, in which selecting the at least one respondent based on the distance comprises automatically without human intervention:
   comparing the originating location of the communication with the determined geographical locations of the potential mobile respondents; and
   assigning a respondent closest to the originating location as the at least one respondent.

4. The method as claimed in claim 1, in which the communication is a telephone call, the method comprising conferencing at least two telephone calls together if the originating locations of the at least two telephone calls are proximate each other.

5. A method of assigning an agent to respond to a communication, the method comprising:
   monitoring geographical locations of a plurality of potential mobile respondents; receiving the communication;
   identifying an originating location from which the communication is received;
   identifying skills required of the potential mobile respondents to respond to the communication;
   accessing a skills database identifying actual skills of the respective potential mobile respondents;
   identifying a group of potential respondents from the plurality of potential mobile respondents, the group of potential respondents being dynamically changed based on the geographical location of each respondent in the group, and based on the skills required and the actual skills; and
   selecting at least one respondent from the dynamic group.

6. The method as claimed in claim 5, which comprises receiving an input from the at least one respondent to perform at least one of queuing the communication, transferring the communication to another respondent, modifying the priority of the communication, and modifying the identified skills required.

7. The method as claimed in claim 5, which comprises routing the communication to the at least one respondent to act as an agent.

8. A method of assigning a respondent, the method comprising:
   monitoring geographical locations of a plurality of potential mobile respondents;
   receiving a plurality of respondent requests;
   identifying an originating location from which the respondent requests are received;
   identifying skills required of the potential mobile respondents to respond to the respondent requests;
   accessing a skills database identifying actual skills of the respective potential mobile respondents;

identifying a group of potential respondents from the plurality of potential mobile respondents, the group of potential respondents being dynamically changed based on a geographical location of each respondent in the group relative to the originating location, and based on the skills required and the actual skills; and instructing at least one respondent from the group of potential mobile respondents to change his location based on at least one originating location.

9. A non-transitory machine-readable medium embodying instructions which, when executed by a machine, cause the machine to:

receive an incoming communication;

identify an originating location from which the communication originates;

determine geographical locations of potential mobile respondents to the communication;

identify skills required of the potential mobile respondents to respond to the communication;

access a skills database identifying actual skills of the respective potential mobile respondents;

select at least one respondent of the potential mobile respondents based on a distance between the originating location of the communication and the determined geographical locations of the potential mobile respondents, and based on the skills required and the actual skills; and assign the selected at least one respondent to respond to the communication.

10. An automatic communication distributor to assign an agent, the automatic communication distributor comprising:

a network interface to receive an incoming communication;

a location arrangement to:

identify an originating location from which the communication originates; and determine geographical locations of potential mobile respondents to the communication; and a processor to:

identify skills required of the potential mobile respondents to respond to the communication;

access a skills database identifying actual skills of the respective potential mobile respondents;

select at least one respondent based on a distance between the originating location of the communication and the determined geographical locations of the potential mobile respondents, and based on the skills required and the actual skills; and assign the selected at least one respondent to respond to the communication.

11. The communication distributor as claimed in claim 10, wherein an availability status of the potential mobile respondents is identified and the at least one respondent is selected based on an associated availability status.

12. The communication distributor as claimed in claim 10, wherein the processor is configured to:

dynamically change a group of the potential mobile respondents based on the geographical location of each respondent in the group; and select the at least one respondent from the dynamic group.

13. The communication distributor as claimed in claim 10, wherein the communication is routed to the at least one respondent to act as an agent.

14. An automatic communication distributor to process communications, the automatic communication distributor comprising:

means for receiving an incoming communication from a caller;

means for identifying an originating location from which the incoming communication originates;

means for determining geographical locations of potential mobile respondents to the communication;

means for identifying skills required of the potential mobile respondents to respond to the communication;

means for accessing a skills database identifying actual skills of the respective potential mobile respondents;

means for selecting at least one respondent based on a distance between the originating location of the communication and the determined geographical locations of the potential mobile respondents, and based on the skills required and the actual skills; and means for assigning the selected at least one respondent to respond to the communication.

\* \* \* \* \*

UNITED STATES PATENT AND TRADEMARK OFFICE
CERTIFICATE OF CORRECTION

| | | |
|---|---|---|
| PATENT NO. | : 8,068,601 B2 | |
| APPLICATION NO. | : 11/460212 | |
| DATED | : November 29, 2011 | |
| INVENTOR(S) | : Shmuel Shaffer et al. | |

It is certified that error appears in the above-identified patent and that said Letters Patent is hereby corrected as shown below:

In column 10, lines 31-47, in Claim 5, delete "5. A method of assigning an agent to respond to a communication, the method comprising:
 monitoring geographical locations of a plurality of potential mobile respondents; receiving the communication;
 identifying an originating location from which the communication is received;
 identifying skills required of the potential mobile respondents to respond to the communication;
 accessing a skills database identifying actual skills of the respective potential mobile respondents;
 identifying a group of potential respondents from the plurality of potential mobile respondents, the group of potential respondents being dynamically changed based on the geographical location of each respondent in the group, and based on the skills required and the actual skills; and
 selecting at least one respondent from the dynamic group." and insert -- 5. A method of assigning an agent to respond to a communication, the method comprising:
 monitoring geographical locations of a plurality of potential mobile respondents;
 receiving the communication;
 identifying an originating location from which the communication is received;
 identifying skills required of the potential mobile respondents to respond to the communication;
 accessing a skills database identifying actual skills of the respective potential mobile respondents;
 identifying a group of potential respondents from the plurality of potential mobile respondents, the group of potential respondents being dynamically changed based on the geographical location of each respondent in the group, and based on the skills required and the actual skills; and
 selecting at least one respondent from the dynamic group. --, therefor.

Signed and Sealed this
Fifteenth Day of May, 2012

David J. Kappos
*Director of the United States Patent and Trademark Office*